United States Patent

[11] 3,596,558

| [72] | Inventor | Edmund W. F. Rydell<br>1900 Dwight Land, Minnetonka, Minn. 55343 |
|---|---|---|
| [21] | Appl. No. | 827,476 |
| [22] | Filed | May 16, 1969 |
| [45] | Patented | Aug. 3, 1971 |

[54] MAGNETIC BASE MILLING MACHINE
4 Claims, 3 Drawing Figs.

[52] U.S. Cl. .................................................. 90/12,
90/15, 77/59 A
[51] Int. Cl. ...................................................... B23c 1/20
[50] Field of Search ............................................ 90/12, 15,
59.9; 51/166.6, 241; 77/59.1, 2

[56] References Cited
UNITED STATES PATENTS

| 1,520,219 | 12/1924 | Barnes ........................... | 90/15 |
| 2,622,457 | 12/1952 | Buck .............................. | 77/59 X |
| 2,629,292 | 2/1953 | McCullough .................. | 90/14 X |
| 2,868,086 | 1/1959 | Gunderson .................... | 90/12 X |
| 3,332,321 | 7/1967 | Jacobsen ....................... | 90/11 |

*Primary Examiner*—Gil Weidenfeld
*Attorney*—James R. Cwayna

ABSTRACT: This invention relates to machine tools and the like and primarily to a machine tool capable of triaxial movement with electromagnetic means included in the base portion thereof to permit the unit to be attached to various magnetic surfaces for machining thereof. The electromagnetic mounting means permits the unit to be moved from place to place for machining selected areas of relatively large surfaces which normally could not be machined with standard milling equipment.

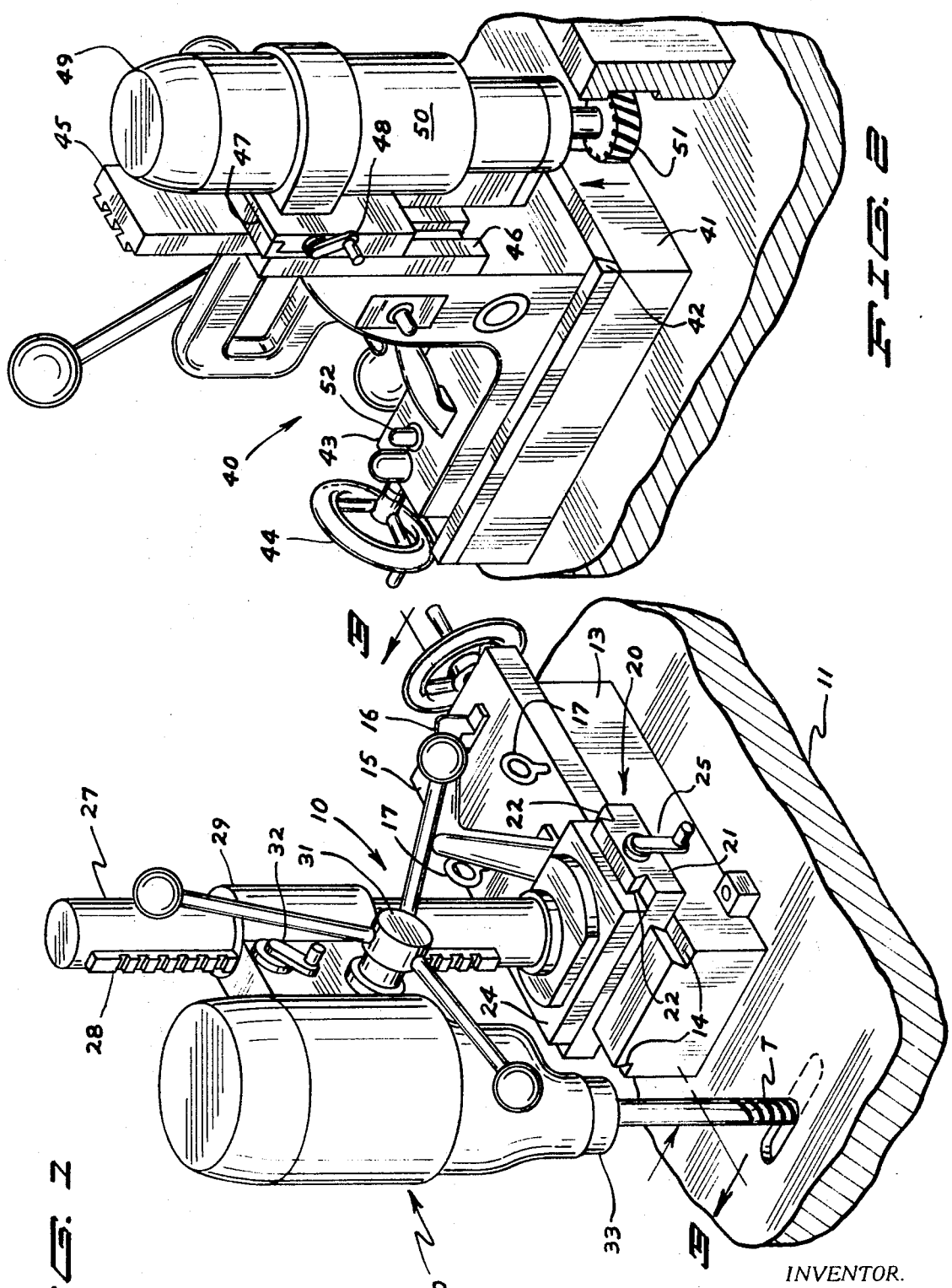

MAGNETIC BASE MILLING MACHINE

In the past, various machine tools, particularly drill presses, have been equipped with magnetic mounting means to enable the same to be positioned at various locations on relatively large surfaces for the drilling of holes at such selected locations. Applicant has conceived a device which utilizes certain of these principles to develop a milling machine having a magnetic base which will permit machining of selected surface areas, rather than simply being usable for drilling holes at selected points on the surface.

With applicant's device, due to the triaxial movement provided, the electromagnetic holding force must provide sufficient force to hold the unit against not only vertical forces tending to lift the unit from the surface, but most also hold the unit against sliding forces which will be exerted thereon when the tool is moved parallel to the plane of the material.

It is therefore an object of applicant's invention to provide a machine tool and more particularly, a machine tool capable of triaxial movement being basically portable in nature, but having electromagnetic positioning and hold down means associated therewith to enable the unit to be positively positioned at predetermined points on a magnetically conductive surface.

It is still a further object of applicant's invention to provide a milling machine or the like, portable in nature, which utilizes as its sole mounting and holding means an electromagnetic source to mount the unit by magnetic attraction.

These and other objects and advantages of the invention will more fully appear from the following description made in connection with the accompanying drawings, wherein like reference characters refer to the same or similar parts throughout the several views, and in which:

FIG. 1 is a perspective view of a first preferred form of a milling machine embodying the applicant's concept;

FIG. 2 is a perspective view of a milling machine of a second modified form; and, FIG. 3 is a vertical section taken substantially along line 3-3 of FIG. 1.

Figure 3:
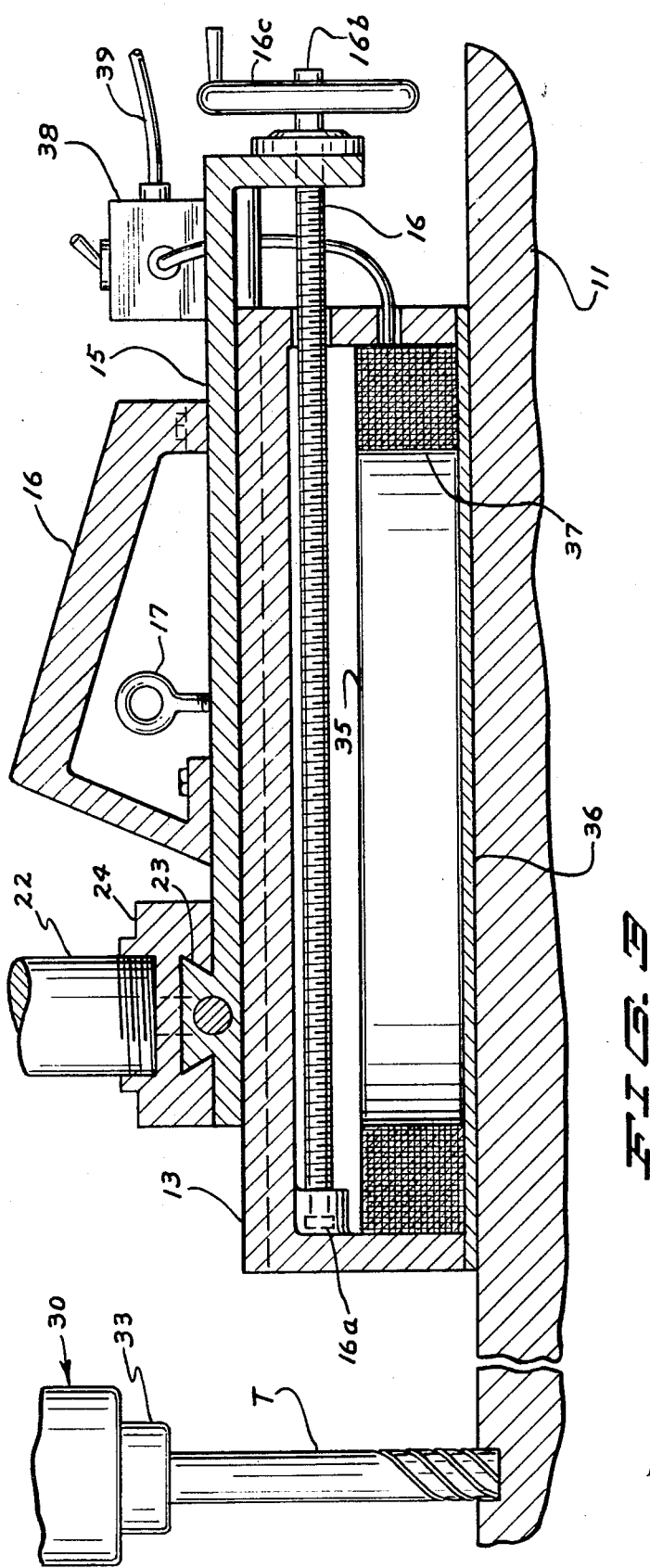

In accordance with the accompanying drawings, applicant's milling machine in a first preferred form as illustrated in FIG. 1 is generally designated 10 and is illustrated mounted on a surface 11 for performing operations thereon. The milling machine as illustrated in FIG. 1, includes a base section 13 having longitudinally extending ways 14–14 formed on the upper surface thereof for guiding a longitudinally moveable member 15 thereon. The member 15 may be provided with a stationary handle portion 16 and lift-off or line retaining eyes 17 thereon. In order to obtain movement of the longitudinal shiftable member 15 a screw device generally designated 16 is provided and as particularly shown in FIG. 3, one end 16a of the screw is captured in the base member 13 with the other end 16b provided with handle means 16c and being threadably connected to the slideable element 15 such that as the screw 16 is rotated the member 15 will obviously slide back and forth on the ways 14 of the base member 13. Slideable member 15 must be provided with mating ways to permit such sliding movement. This way system could include other means to afford the longitudinal movement with respect to the base portion 13.

A second lateral moveable device generally designated 20 is provided on the moveable member 15 and includes a base member 21 provided with ways 22–22 on the upper surface thereof to be in mating moveable relation with the ways of a laterally moveable tool or column holder 24. This column holder 24, is laterally positionable through the use of a screw or other positioning device as for example, operated through handle 25.

A tool holding column 27 is provided and is secured to the upper plate 24 of the laterally moveable element 20 and includes a rack section 28 on a selected portion thereof to permit the power portion 30 of the unit 10 to be moved vertically thereon. Rack and pinion movement of such devices is well known in the art and in the form shown, includes a collar 29 completely surrounding the column 27 with means therein which will be operated through the rotatable handle device 31 to raise the power and cutting section 30 upwardly along the column 27. A locking element 32 is provided to lock the cutting and motor section 30 in positive vertical position on the column 27.

Power unit 30 in the form shown includes a self-contained source of rotary power which is electrically driven through connection to an external power source and such a device is commonly known in the art. This power unit 30, of course, provides rotary motion for a tool which will be held in an appropriate tool holder 33.

In order to properly mount the unit 10 onto the surface 11 to be machined, the lower housing portion 13 is provided with an internal cavity 35 closed through a bottom cover plate 36. Within the cavity 35 is housed an electromagnetic 37 which will produce upon actuation or energization a magnetic force obviously sufficient to hold the unit 10 in proper stationary position. Means are provided to control the electromagnetic 37 such as a switch element 38 which receives energy through a conductor 39.

In a modified form of the invention, the primary distinction is the arrangement of the vertical and lateral tool moving members. In the form shown, the unit now designated 40 includes a base 41 having longitudinal guideways 42 thereon to shift the tool holder portion 43 longitudinally through operation of the handle 44. The vertical column in this case includes a dovetail arrangement having a moveable vertical section 45 riding on a stationary set of vertical ways 46. Obviously, means must be provided for advancing this vertically moveable way section 45 along the stationary ways 46. An arrangement to laterally shift the cutting portion and motor driven portion 50 is likewise provided and this is designated 47. Obviously, the lateral movement is obtained through operation of the handle element 48. The motor member in the form shown includes, a source of rotary power 49 for tool 51. Switch means 52 are provided to control both the electromagnet arranged within the base section 41 and the rotary power source 49.

As illustrated in the two forms, it is necessary that the magnetic source be sufficient to prevent movement of the device when the unit is operating in a triaxial direction while performing operations on the work piece. The uniqueness in this invention lies basically in the fact that applicant has provided an electromagnet positioning means for a multidirectional working tool rather than simply utilizing a tool which is operable in only a vertical direction.

What I claim is:

1. A portable machine tool comprising:
   a. a base;
   b. a tool head having means for supporting a work tool and power means for rotating said work tool;
   c. magnetic means carried by said base for removably attaching the same to a workpiece;
   d. means mounting said tool head for triaxial slidable movement on said base; and
   e. said mounting means including means for adjustably positioning said tool head along each of said axes of movement, and for feeding said work tool into the workpiece along each of said axes during the machining thereof.

2. The structure set forth in claim 1 wherein said magnetic attaching means includes an electromagnet.

3. The structure set forth in claim 2 and switching means for controlling said electromagnet.

4. The structure set forth in claim 7 and said mounting means for mounting said work head for triaxial movement permits movement in mutually perpendicular directions.